UNITED STATES PATENT OFFICE.

ROBERT W. DAVIS, JR., OF WYANDOTTE, MICHIGAN, ASSIGNOR TO PENNSYLVANIA SALT MANUFACTURING COMPANY, OF PHILADELPHIA, PENNSYLVANIA, A CORPORATION OF PENNSYLVANIA.

METHOD OF MANUFACTURING METALLIC-OXID ELECTRODES.

1,039,071.    Specification of Letters Patent.    Patented Sept. 17, 1912.

No Drawing.    Application filed August 17, 1911. Serial No. 644,585.

*To all whom it may concern:*

Be it known that I, ROBERT WILLIAM DAVIS, Jr., a resident of Wyandotte, in the county of Wayne and State of Michigan, have invented a new and useful Method of Manufacturing Metallic-Oxid Electrodes, of which the following is a full, clear, and exact description.

My invention has relation to the manufacture of electrodes for electrolytic purposes by converting metallic iron into a conducting oxid. A number of methods have heretofore been proposed for the manufacture of these electrodes, but they have not proven satisfactory in practice for various reasons, either because of the poor conductivity of the resulting electrodes or from other causes.

I have discovered that I can produce electrodes of good conductivity and having a coating of practically pure magnetic oxid ($Fe_3O_4$) by heating iron of any desired shape in a furnace within which hydrogen gas is burned at a temperature preferably above 600 degrees centigrade and preferably below 1100 degrees centigrade. The iron is directly exposed within the furnace chamber to the action of the hydrogen flame. At temperatures above 1100 degrees centigrade the oxidation is very rapid, but sometimes the conductivity is not as good, and better results are usually obtained below this temperature, but above 600 degrees centigrade.

What I claim is:—

1. In the manufacture of electrodes or similar articles, the step consisting of exposing steel or iron of the desired shape to a hydrogen flame for a sufficient time to produce a substantial layer of iron oxid thereon; substantially as described.

2. The method of making electrodes or similar articles, consisting in inserting iron or steel articles of the desired shape in a furnace chamber and burning hydrogen gas in said chamber to expose the articles to the flame for a sufficient time to produce a substantial layer of magnetic oxid of iron thereon; substantially as described.

3. The method of making electrodes or similar articles, consisting in exposing iron to a hydrogen flame at a temperature of 600° C. for a sufficient time to afford a substantial layer of substantially pure magnetic oxid thereon; substantially as described.

In testimony whereof, I have hereunto set my hand.

R. W. DAVIS, JR.

Witnesses:
A. E. GIBBS,
CARL B. GOTTS.